US008958191B2

(12) United States Patent
Jerg et al.

(10) Patent No.: US 8,958,191 B2
(45) Date of Patent: Feb. 17, 2015

(54) FIRE PROTECTION DEVICE FOR DOMESTIC APPLIANCES

(75) Inventors: Helmut Jerg, Giengen (DE); Stefan A. Staedel, Pfafenhofen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 763 days.

(21) Appl. No.: 12/721,590

(22) Filed: Mar. 11, 2010

(65) Prior Publication Data

US 2010/0165531 A1 Jul. 1, 2010

Related U.S. Application Data

(63) Continuation of application No. 10/734,054, filed on Dec. 10, 2003, now abandoned, which is a continuation of application No. PCT/EP02/06518, filed on Jun. 13, 2002.

(30) Foreign Application Priority Data

Jun. 26, 2001 (DE) .................................... 10130608

(51) Int. Cl.
*H02H 3/08* (2006.01)
*A62C 3/16* (2006.01)

(52) U.S. Cl.
CPC ........................................ *A62C 3/16* (2013.01)
USPC ........................................................ 361/93.1

(58) Field of Classification Search
USPC ........................................................ 361/93.1
See application file for complete search history.

(56) References Cited

U.S. PATENT DOCUMENTS

| | | | | |
|---|---|---|---|---|
| 3,824,374 | A | 7/1974 | Mayher | |
| 4,483,314 | A | 11/1984 | Parker, Jr. et al. | |
| 4,834,188 | A | 5/1989 | Silverman | |
| 5,936,531 | A | 8/1999 | Powers | |
| 5,946,180 | A * | 8/1999 | Simpson | 361/93.3 |
| 6,046,441 | A * | 4/2000 | Daffron | 219/506 |

FOREIGN PATENT DOCUMENTS

| | | | |
|---|---|---|---|
| DE | 3809754 | A1 | 11/1988 |
| FR | 2543839 | A1 | 10/1984 |

* cited by examiner

*Primary Examiner* — Rexford Barnie
*Assistant Examiner* — Ann Hoang
(74) *Attorney, Agent, or Firm* — James E. Howard; Andre Pallapies

(57) ABSTRACT

A fire protection device for preventing damage to a domestic appliance from a malfunction which occurs in the appliance. The fire protection device includes at least one fault current circuit breaker, which disconnects the electrical supply from the appliance when a fault current is sensed. The fire protection device also includes at least one gas sensor which also disconnects the electrical supply from the appliance when a predetermined quantity of a control gas is sensed in the appliance.

18 Claims, 1 Drawing Sheet

FIRE PROTECTION DEVICE FOR DOMESTIC APPLIANCES

CROSS-REFERENCE OF RELATED APPLICATIONS

This application is a continuation, under 35 U.S.C. §120, of U.S. application Ser. No. 10/734,054, filed Dec. 10, 2003, which itself was a continuation, under 35 U.S.C. §120, of International Application No. PCT/EP02/06518, filed Jun. 13, 2002, which designated the United States; this application also claims the priority, under 35 U.S.C. §119, of German patent application No. 101 30 608.3, filed Jun. 26, 2001; the prior applications are herewith incorporated by reference in their entirety.

BACKGROUND OF THE INVENTION

The invention relates to a fire protection device for domestic appliances.

Domestic appliances, which have several power consumers, such as for example motors, heaters etc., are usually not subjected to individual checks on their electrical safety. In order to avoid damage to the domestic appliances, as a result of excess current, domestic appliances generally have safety devices, which have for example a safety button made of porcelain or ceramic, which glows when a specific current strength is reached and thus protects the domestic appliance from further damage, in particular smouldering fires or the like.

Because ignitable and inflammable materials are used in the manufacture of electrical appliances for the household, there may be a heightened risk that these materials catch fire in the event of a short circuit or when electric wires wear through. DE 38 09 754 A1 discloses a device with a container for a fire retardant substance for extinguishing such fires, which container opens automatically in the presence of a flame or when the ambient temperature rises above a limit parameter, for the purpose of pouring the fire retardant substance indirectly or directly onto the parts of the appliance endangered by fire or which are to be protected therefrom. In this case an arrangement can be made where the containers, preferably several of them, in each case have cells containing fire retardant substance and which effectively have boreholes in the floor region, which are occluded by a protective film or a membranous skin, for example, which bursts at a preset temperature to open up the boreholes and in the process let the fire retardant substance escape.

It has proven advantageous with this device that the objects located in the vicinity of the electrical appliance are protected from the spread of the fire, but the electrical domestic appliance is completely destroyed or at least is so badly damaged that extensive repairs are required. Also, compared to the destruction of several domestic appliances, in the kitchen for example, when the loss of a single domestic appliance proves to be comparatively low, it is all the same desirable to protect this electrical appliance from total damage, as far as possible. But because the device disclosed in DE 38 09 754 A1 comes into play only when the electrics are already partially destroyed, substantial damage has already occurred in this appliance.

BRIEF SUMMARY OF THE INVENTION

The object of the present invention is therefore to provide a fire protection device for domestic appliances, which already at the outset of a malfunction which could potentially result in the domestic appliance catching fire, said device carries out measures which can protect the domestic appliance from further damage, and prevent the danger of fire.

The object of the present invention is therefore to provide a fire protection device for domestic appliances, which already at the outset of a malfunction which could potentially result in the domestic appliance catching fire, said device carries out measures which can protect the domestic appliance from further damage, and prevent the danger of fire.

With the fire protection device for domestic appliances according to the present invention the spread of a smouldering fire, caused by electrical failures, is prevented, since gases resulting from smouldering are detected by at least one gas sensor, and a signal is generated from a certain quantity of control gas, for example carbon monoxide (CO) and/or chlorine (Cl), is present inside the domestic appliance, which preferably results in disconnection of the electricity supply inside the domestic appliance. Apart from the gas sensor at least one fault current circuit breaker is also put in place, which initiates a, preferably all-pole, disconnection of the electricity supply of the domestic appliance as soon as a fault current occurs in one of the electrical conductors in the domestic appliance, and thus for example prevents heating and igniting of synthetic materials. Advantageously the fault current circuit breaker is integrated into the mains plug of the domestic appliance, such that the size of the mains plug is only slightly larger than a standard mains plug. Yet it can prove effective to arrange the fault current circuit breaker in the domestic appliance such that it fulfils a function of main switch, that is, the domestic appliance can be switched on and off by way of the fault current circuit breaker. This compact construction enables the fire protection device according to the present invention to be divided into three chief components, consisting of a special gas sensor technology in the floor region or in the door of the domestic appliance, a special mains plug, or main switch and electric conductors, which take on the additional function of, preferably all-pole, disconnection of the domestic appliance.

With the fire protection device for domestic appliances according to the present invention it eventuates that a fault current, smouldering, an open fire or smoke is recognised and the dishwashing machine is cut off promptly from the mains supply and on the one hand any spread of the malfunctions is prevented, or the very occurrence of malfunctions is prevented, and on the other hand the electric ignition energy for the fire or the smouldering is stopped. When the fire protection device for domestic appliances according to the present invention is used fault currents or short circuits in the appliance are already recognised, before they can result in an outbreak of smouldering or open fire caused thereby. Furthermore, the onset of smoke, attributable essentially to polyethylene (PE), polypropylene (PP), polyamide (PA), polyvinyl chloride (PVC) or polystyrol (PS), is detected early enough by the gas sensor, since carbon monoxide (CO) and/or chlorine (Cl) is released when these synthetic substances combust. By the mains being disconnected leak currents can be prevented from skipping from or to adjacent electrical appliances, which are situated in the same current circuit. The invention provides a fire protection device for domestic appliances, which, at the outset of a malfunction which could potentially result in the domestic appliance catching fire, carries out measures which can protect the domestic appliance from further damage, and prevent the danger of fire.

Advantageously the main switch of the domestic appliance, which is used to supply the individual components of the domestic appliance, is connected to the mains plug, whereby the main switch is supplied only with low voltage.

With the fire protection device according to the present invention it is guaranteed that essential electric currents running in the interior of the domestic appliance are provided as low voltage, with the exception of electric currents e.g. for motors and heaters. Via the fire protection device according to the present invention advantageously no electric conductor with alternating current of 230 V is guided through the domestic appliance as far as the main switch.

Advantageously the gas sensor is arranged in the floor region and/or a door of the domestic appliance. The signal for switching on, switching off or disconnection of the domestic appliance by means of a fault current circuit breaker can be given via direct connection (conductor/flexible cord), as radio signal or also via an appliance-internal or appliance-external bus. Through switching on, switching off or disconnection of the domestic appliance by means of a fault current circuit breaker the function of the fault current circuit breaker is advantageously checked each time. The gas sensor circuit compares the accumulated actual values to the detected parameters and triggers a disconnection signal in the event of sufficient deviation. This signal results in, preferably all-pole, disconnection of the domestic appliance.

BRIEF DESCRIPTION OF THE DRAWINGS

The fire protection device according to the present invention will be explained hereinbelow in greater detail with reference to preferred embodiments, in which.

DETAILED DESCRIPTION OF EXEMPLARY EMBODIMENTS OF THE PRESENT INVENTION

The fire protection device for domestic appliances according to the present invention will be explained hereinbelow in terms of an embodiment of a dishwashing machine 2.

Figure 1:
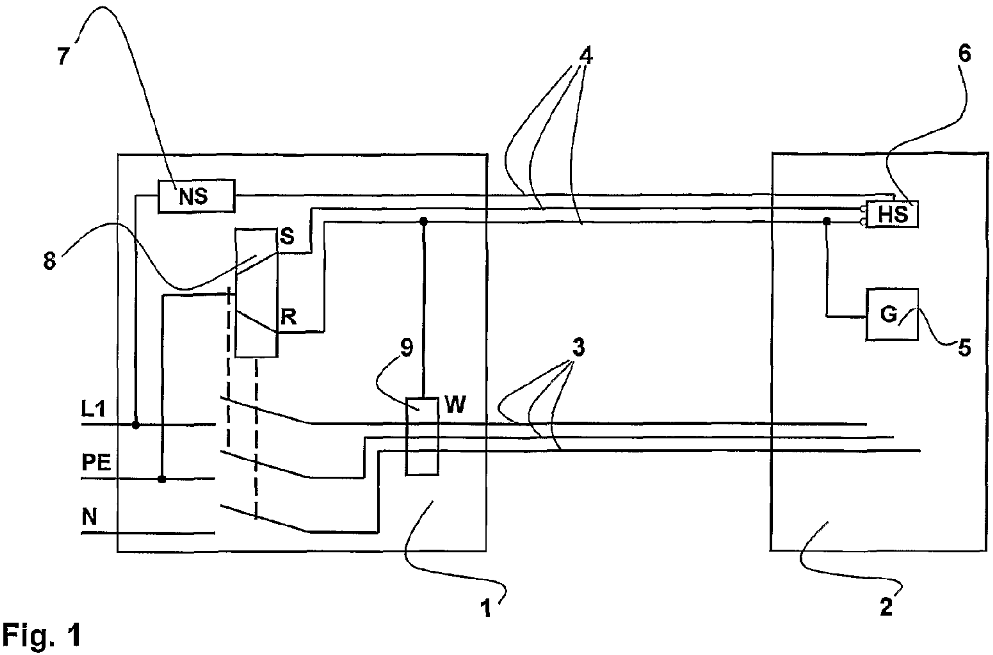
FIG. 1: shows a circuit plan of a mains plug, its fire protection device according to the present invention as well as a schematic diagram of the domestic appliance.

The fire protection device according to the present invention with a circuit plan as in FIG. 1 shows a mains plug 1, which is connected to the dishwashing machine 2 via electric conductor bundles 3 and 4. The conductor bundles 3 lead from the mains plug 1 to the electrical consumers, such as for example motors or heaters, the conductor bundles 4 lead from the mains plug 1 to the main switch, which can e.g. be designed as four-way operation buttons. The conductor bundles 4 are configured as low voltage conductors. Arranged in the floor region of the dishwashing machine 2 in the illustrated embodiments is a gas sensor 5, assigned to which is a gas sensor circuit, and is connected by way of electric conductors to the main switch 6, so that when a signal of the gas sensor 5 is emitted the main switch 6 interrupts the main current circuit and the dishwashing machine 2 is them without current. Provided in the mains plug 1 is a transformer unit 7, which transforms incoming 230 V alternating current to a low voltage via flexible cord L1. In addition, a relay 8, in the embodiments a bistable relay 8, is provided in the mains plug 1, which is connected via both channels R and S to the main switch 6.

With the signal induced by the main switch 6 to channel S the relay 8 closes and switches on the dishwashing machine 2, and with the signal to channel R opens the relay 8 and disconnects the dishwashing machine 2. Located in the main current circuit, which is built up essentially by the conductor bundles 3, is a cumulative current transformer 9, which constantly measures the sum of all currents and from a certain deviation, which is attributable for example to a fault current, sends a signal to the reset inlet—channel R—of the relay 8, so that finally the main switch 6 of the dishwashing machine 2 disconnects.

Figure 2:
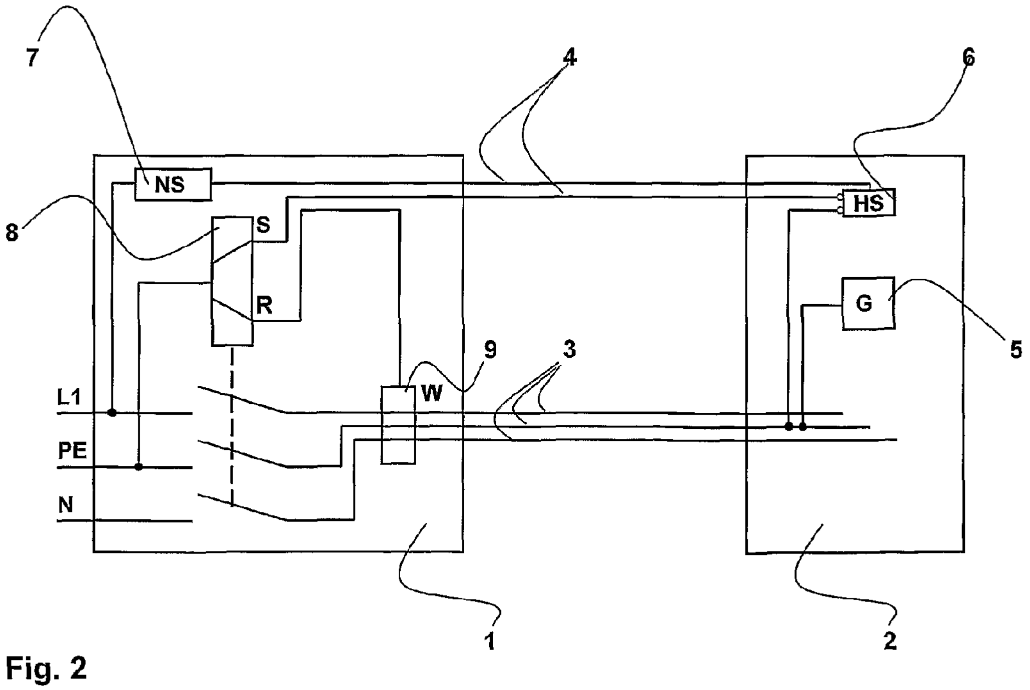
FIG. 2: shows another preferred embodiment of the fire protection device according to the present invention.

With the fire protection device according to the present invention with a circuit plan according to FIG. 2 the same components are designated as in the circuit plan in FIG. 1. A technical variant comprises placing the gas sensor 5 and the main switch 6 not directly in the reset channel of the relay 8, but rather to guide both conductors via the protective conductor PE. The technical features, in particular the performance features of the circuit as per FIG. 2, are identical to the performance features of the circuit as in FIG. 1.

The invention provides a fire protection device for domestic appliances 2, which carries out measures at the outset of a malfunction with potential fire consequences for the dishwashing machine 2, in order both to protect the dishwashing machine 2 from further damage, and to prevent the danger of fire.

What is claimed is:

1. A fire protection device for a domestic appliance, the fire protection device comprising:

a fault current detector to detect a fault current in the domestic appliance and to generate a fault current signal upon detection of the fault current;

a fault current switch arranged inside the domestic appliance, the fault current switch to receive the fault current signal from the fault current detector and to disconnect power supply to the domestic appliance from the domestic appliance;

a gas sensor to detect a threshold quantity of a control gas in the domestic appliance and to generate a control gas threshold signal upon detection of the threshold quantity of the control gas; and a main switch to receive the control gas threshold signal from the gas sensor and to disconnect the power supply to the domestic appliance from the domestic appliance.

2. The fire protection device of claim 1, wherein the fault current switch is the main switch.

3. The fire protection device of claim 1, wherein each of the fault current switch and the main switch is structured to disconnect the power supply by an all-pole disconnection.

4. The fire protection device of claim 1, wherein the domestic appliance has a plurality of operational modules structured to operate the domestic appliance, and wherein the main switch is structured to supply low voltage electricity to the plurality of operational modules.

5. The fire protection device of claim 1, wherein the gas sensor is connected to the fault current switch.

6. The fire protection device of claim 1, further comprising a protective conductor, wherein the gas sensor is directly connected to the protective conductor, and wherein the fault current switch is triggered when the gas sensor detects the threshold quantity of the control gas.

7. The fire protection device of claim 1, further comprising a protective conductor, wherein the main switch is directly connected to the protective conductor.

8. The fire protection device of claim 1, wherein the domestic appliance includes a door, and wherein the gas sensor is arranged in the door.

9. The fire protection device of claim 1, wherein the domestic appliance has a predetermined bottom region, and wherein the gas sensor is arranged in the predetermined bottom region.

10. A domestic appliance, comprising:

a fault current detector to detect a fault current in the domestic appliance and to generate a fault current signal upon detection of the fault current;

a fault current switch arranged inside the domestic appliance, the fault current switch to receive the fault current signal from the fault current detector and to disconnect power supply to the domestic appliance from the domestic appliance;

a gas sensor to detect a threshold quantity of a control gas in the domestic appliance and to generate a control gas threshold signal upon detection of the threshold quantity of the control gas; and a main switch to receive the control gas threshold signal from the gas sensor and to disconnect the power supply to the domestic appliance from the domestic appliance.

11. The domestic appliance of claim 10, wherein the fault current switch is the main switch.

12. The domestic appliance of claim 10, wherein each of the fault current switch and the main switch is structured to disconnect the power supply by an all-pole disconnection.

13. The domestic appliance of claim 10, wherein the domestic appliance has a plurality of operational modules structured to operate the domestic appliance, and wherein the main switch is structured to supply low voltage electricity to the plurality of operational modules.

14. The domestic appliance of claim 10, wherein the gas sensor is connected to the fault current switch.

15. The domestic appliance of claim 10, further comprising a protective conductor, wherein the gas sensor is directly connected to the protective conductor, and wherein the fault current switch is triggered when the gas sensor detects the threshold quantity of the control gas.

16. The domestic appliance of claim 10, further comprising a protective conductor, wherein the main switch is directly connected to the protective conductor.

17. The domestic appliance of claim 10, wherein the domestic appliance includes a door, and wherein the gas sensor is arranged in the door.

18. The domestic appliance of claim 10, wherein the domestic appliance has a predetermined bottom region, and wherein the gas sensor is arranged in the predetermined bottom region.

* * * * *